United States Patent Office 3,316,647
Patented May 2, 1967

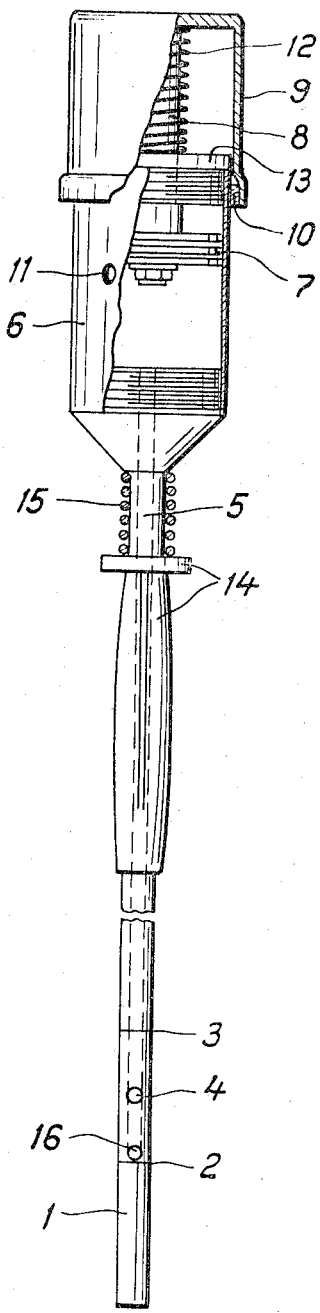

3,316,647
OIL LEVEL INDICATOR
Sven Arild Swallert, 11 Rue Michel Chauvet,
Geneva, Switzerland
Filed May 12, 1965, Ser. No. 455,089
2 Claims. (Cl. 33—126.7)

The present invention relates to an oil level indicator, for instance for automobile engines, comprising a suction pump consisting of a container having a translucent wall and adopted upon a tubular dip stick secured to a holder and having a passage connecting the interior of the container with an opening through the wall of the dip stick at a point of the stick corresponding to the normal or intended level of the oil.

A known oil level indicator of this kind is provided with a container consisting of a ball-shaped hollow container made of non-rigid plastic material, which container after being compressed expands and thus lifts oil by suction into the container through the tubular stick provided the opening in the wall of the stick is located beneath the oil level of the oil pan the oil level of which is to be measured. Thus, due to the fact that the wall of the ball-shaped container is translucent, oil entering into the container when the container expands becomes visible and indicates that the oil level in the oil pan is located above the opening in the wall of the dip stick. A serious drawback is, however, that the oil remains in the container until next compression. At the next compression oil is pressed out from the container through the tubular stick. Then, when the container expands, a quantity of oil may remain in the container and moreover oil is drawn back again from the tubular stick into the container thus causing a misleading indication. Moreover it is impossible to prevent the wall of the container from becoming opaque due to lasting contact with the oil and due to fouling of the outside of the wall of the container.

The object of the invention is to provide an oil level indicator in which said inconveniences are fully eliminated. According to the invention this is achieved by the fact that the oil level indicator is provided with a cylindrical container in which a piston is slidingly mounted against the action of a spring arranged to press the piston in the direction from the tubular stick against a stopping member in which position an opening in the wall of the container is situated just inside the inner edge of the piston. When the piston is returned by the spring from a pressed-in position, oil is lifted by suction into the cylindrical container but as soon as the piston reaches the upper end position defined by said stopping member the interior of the container is connected to the outside of the container by the opening in the wall of the container, so that the oil in the container immediately escapes through the tubular stick. Due to the short-duration contact between the oil and the inner wall of the container there is no tendency for the wall of the container to become opaque, and moreover the inner wall of the container is effectively cleaned by the piston before each indication. In order to facilitate a true indication a preferred embodiment of the invention is provided with a cleansing ring attached to the inside of a cap slidingly mounted on the outside of the upper part of the cylindrical container and rigidly secured to the piston. Accordingly each time the piston and the cap are pressed down and then returned by the resetting spring the outside of the container wall is cleansed by the cleansing ring and at the same time the opening in the container wall is prevented from becoming covered by dirt.

The invention is more closely explained in the following with reference to the accompanying drawing showing a preferred embodiment of the invention.

The embodiment shown on the drawing is provided with a dip stick 1, which in the usual manner is provided with a score 2 showing the minimum level and a score 3 showing the maximum level of the oil, the level of which is to be measured. Right between the scores 2 and 3 there is a radial boring 4, which through an axial passage 5 in the stick communicates with the interior of a cylindrical container 6 attached to the upper end of the tubular stick and made of translucent material. The container 6 is provided with a cylindrical piston 7 sealingly sliding against the inner wall of the container and fixedly mounted on a piston rod 8, which in turn is attached to the upper end of a cap 9 slidingly mounted outside the container and having a cleaning ring 10 fastened to the inside of the lower edge of the cap in the clearance between the cap 9 and the container 6. The piston 7 is shown on the drawing in its non-operated position in which the inner edge of the piston is situated just above an opening 11 in the wall of the container 6. The piston is actuated by a resetting spring 12 mounted between the upper part of the cap 9 and a plug 13 closing the upper end of the container 6, which plug is provided with a central boring in which the piston rod 8 is slidingly mounted. The under side of the plug 13 constitutes a stopping member against which the piston 7 is pressed in its non-operated position by the resetting spring 12. When the cap 9 is pushed down, the piston passes by the opening 11, and then air is pressed out of the container through the boring 4. Then, when the piston resets to its upper, non-operated position oil is lifted up into the container 6 by suction if the boring 4 is situated under the oil level which is to be measured. Due to the reciprocating motion of the cap 9 and the piston 7 the inner wall of the container 6 is cleansed by the piston 7 and the outer wall of the container is cleansed by the ring 10, for example, a felt ring, so that oil entering into the container becomes clearly visible. As soon as the piston during the resetting motion passes the opening 11 the suction ceases and oil lifted up into the container escapes through the passage 5 and the boring 4.

The dip stick is in the usual manner provided with a holder 14 with a flange which holder is removably attached to the vessel containing oil, the level of which is to be measured, for example, the crank case of an automobile engine. If no oil enters into the container 6 when the piston resets to its upper non-operated position the oil level in the vessel or crank pit apparently is located under the boring 4 and the exact level can be read off in the usual way by removing the dip stick 1 from the vessel.

In order to make it possible to decide if the oil level is located below the minimum score without removing the stick from the vessel the holder 14 can be resiliently mounted on the stick against the action of a strong compression spring 15 mounted between the flange of the holder 14 and the bottom wall of the container 6, so that after pushing down the cap 9 very hard, so that the container 6 and the stick 1 are displaced downwards a distance equal to the distance between the minimum level score 2 and the boring 4, the boring 4 reaches the minimum level of oil. If the container and the stick is retained in this position during the resetting motion of the piston, oil reaching the minimum level is lifted up into the container by suction. Alternatively a second large boring 16 communicating with the passage 5 may be arranged at the score 2, so that the container 6 is filled only to a part if the oil level in the vessel is located between the borings 4 and 16.

What is claimed is:

1. An oil level indicator, for instance for automobile engines, comprising a suction pump including a cylindrical container having a translucent wall, a tubular dip stick upon which said container is mounted, a holder to which said dip stick is secured, said dip stick having a passage connecting the interior of said container with an opening through the wall of the dip stick at a point of the stick corresponding to the normal level of the oil, a piston mounted in said container for sliding movement toward and away from said dip stick, said container having an opening in its side walls, a resetting spring operably engaging said piston to press said piston in the direction away from said tubular stick against a stopping member in which position said opening in the wall of said container is closer than said piston to said dip stick.

2. An oil level indicator as claimed in claim 1, wherein a cap is slidingly mounted on the outside of the upper part of the cylindrical container and is rigidly secured to the piston, said cap having a cleansing ring attached to the inside of the cap and pressed against the outside of the container.

References Cited by the Examiner

UNITED STATES PATENTS 2,660,342   11/1953   Ruf _____ 73—425.6

FOREIGN PATENTS 1,065,218   9/1959   Germany.

LEONARD FORMAN, *Primary Examiner.*

L. ANDERSON, *Assistant Examiner.*